E. A. PATCH.
TRACTOR.
APPLICATION FILED JUNE 16, 1921.
1,428,394.
Patented Sept. 5, 1922.
2 SHEETS—SHEET 1.
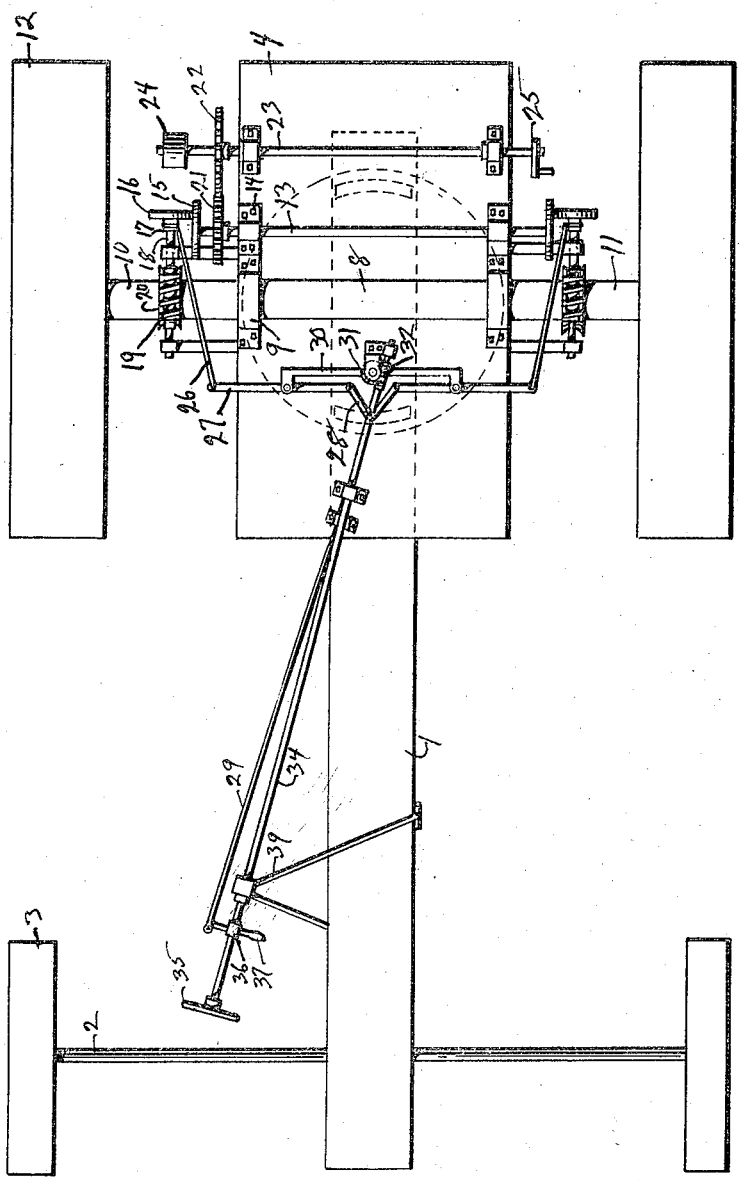
Ernest A. Patch
INVENTOR.
Witness.
BY
Richard B. Oliver,
ATTORNEY.

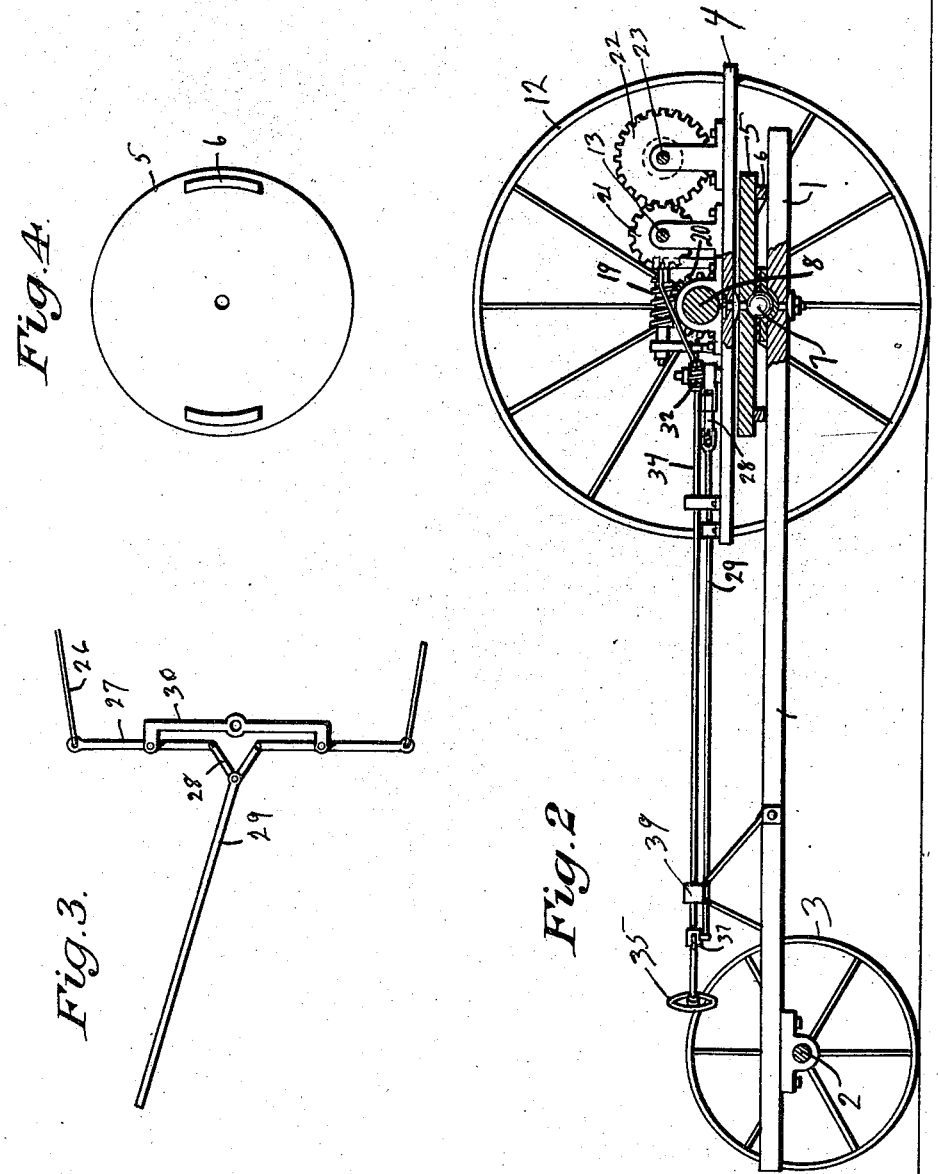

Patented Sept. 5, 1922.

1,428,394

UNITED STATES PATENT OFFICE.

ERNEST A. PATCH, OF PRATTSBURG, NEW YORK.

TRACTOR.

Application filed June 16, 1921. Serial No. 478,010.

*To all whom it may concern:*

Be it known that I, ERNEST A. PATCH, a citizen of the United States, residing at Prattsburg, in the county of Steuben and State of New York, have invented certain new and useful Improvements in Tractors, of which the following is a specification.

This invention relates to tractors and has for its principal object to provide an extremely efficient steering mechanism which may be easily manipulated and will be positive in operation.

Another object of the invention is to provide simple and efficient means for shifting a disk speed changing mechanism in conjunction with a steering mechanism whereby one wheel may be rotated at a greater speed in relation to the other wheel thereby causing the turning of one truck of the tractor.

With these and numerous other objects in view, the invention resides in certain novel features of construction, and the combination and arrangement of parts as will be hereinafter fully described and claimed.

In the drawing:—

Figure 1 is a top plan view of the tractor,

Figure 2 is a longitudinal sectional view taken therethrough,

Figure 3 is a detailed plan view of the speed changing and steering mechanism, and Figure 4 is a plan view of the plate used in conjunction with the invention.

Referring to the drawing in detail it will be noted that the frame 1 is elongated and has mounted thereon at its rear end an axle 2 carrying upon its ends the rear wheels 3 of the tractor which may be of any preferred construction. This rear truck consisting of the axle 2 and wheels 3 may be removed in order that the frame 1 may be attached to an agricultural implement or the like if so desired. At the forward end of the frame 1 there is situated a platform 4 which is pivotally connected to the forward end of the frame. This is accomplished by having a disk 5 interposed between the platform 4 and the frame 1 and circular ridges 6 are attached to this disk so as to slightly space the same from the frame 1. A ball and socket 7 is arranged between the disk 5 and the frame 1 and the ball is provided with a bolt that passes through the platform 4 thus holding this platform in pivotal or swivel relation with the frame 1.

An axle 8 is mounted on the platform 4 by means of the journal brackets 9 and this axle 8 is formed in sections. The sections 10 and 11 having keyed thereon the traction wheels 12. Any suitable propelling means may be carried on this platform such as an internal combustion engine for driving the shaft 13 which is journaled in brackets 14 and extends beyond the longitudinal side edges of the platform 4 and is provided at each end with a driving disk 15 adapted to frictionally engage a driven disk 16. The driven disks 16 are attached to collars 17 keyed to and slidably mounted on the shafts 18 which are provided with worms 19 meshing with worm gears 20 which are keyed to the sections 10 and 11. A gear wheel 21 is also keyed to the shaft 13 and meshes with a similar gear wheel 22 carried by a shaft 23 which has mounted thereon a pulley 24 so that a belt may be placed thereover for driving any mechanism on the agricultural instrument to which the tractor is attached. A crank 25 is mounted on the other end of this shaft 23 which may be used for cranking the engine (not shown). The connecting members 26 are attached to the collars 17 at one end and at the other end to the levers 27. These levers 27 are pivotally attached at their extremities to the links 28 both of which are attached to the rod 29. A bar 30 is pivoted at each of its ends to the intermediate portion of the levers 27 and is provided intermediate its ends with a worm gear 31 mounted in a suitable bracket which is in mesh with the worm 32 carried on a steering shaft 34 having a steering wheel 35 at its end. A block 36 is mounted on the shaft 34 in any suitable manner so as to not slide thereon and not rotate therewith. A lever 37 is pivoted in this block 36 and is attached to the rod 29. This shaft 34 may be journaled in any suitable kind of bracket as illustrated at 39.

In operation when it is desired to steer the tractor the shaft 34 is rotated thus turning the bars 30 through the intermediacy of the worm 32 and worm gear 31. As this bar 30 is rotated it will move one of the driven disks 16 toward the center of the driving disk 15 whereas the other will be moved toward the periphery of the corresponding driving disk 15 thus causing one of the traction wheels 12 to rotate faster than the other thereby causing the platform and all parts carried thereby to rotate. It is thought that the steering mechanism will now be readily understood. In order to change the speed of the tractor all that is necessary is to operate the lever 37. By operating this lever 37 it will be seen that the rod 29 will be moved thus pivoting the levers 27 whereby the disks 16 will be moved toward or away from the center of the driving disks 15.

From the foregoing description, taken in connection with the accompanying drawings, the construction and operation of the tractor will be readily understood without a more extended explanation. As numerous changes in form, proportion, and in the minor details of construction may be resorted to without departing from the spirit of this invention, I do not wish to be limited to the construction herein shown and described other than as claimed.

Having thus described my invention what I claim as new is:—

In a vehicle, a pair of driving disks, a pair of driven disks, in engagement therewith, a bar, a worm gear provided on the bar intermediate its ends, a worm in mesh with the worm gear, a shaft for actuating the worm, a pair of levers pivoted intermediate their ends to the terminals of the bar, connecting means attached to the ends of the levers and the driven disks, links carried by the levers, and a rod connected to the links.

In testimony whereof I affix my signature in presence of two witnesses.

ERNEST A. PATCH.

Witnesses:
WINFIELD SMITH,
HENRY S. PATCH.